United States Patent
Chandramouli et al.

(10) Patent No.: US 10,355,836 B2
(45) Date of Patent: Jul. 16, 2019

(54) BEARER SETUP IN DUAL CONNECTIVITY

(71) Applicant: Nokia Technologies Oy, Espoo (FI)

(72) Inventors: Devaki Chandramouli, Plano, TX (US); Tsunehiko Chiba, Saitama (JP)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 15/565,285

(22) PCT Filed: May 14, 2015

(86) PCT No.: PCT/US2015/030879
§ 371 (c)(1),
(2) Date: Oct. 9, 2017

(87) PCT Pub. No.: WO2016/182580
PCT Pub. Date: Nov. 17, 2016

(65) Prior Publication Data
US 2018/0062800 A1 Mar. 1, 2018

(51) Int. Cl.
*H04W 4/00* (2018.01)
*H04L 5/00* (2006.01)
(Continued)

(52) U.S. Cl.
CPC ....... *H04L 5/0032* (2013.01); *H04W 72/0426* (2013.01); *H04W 72/0433* (2013.01);
(Continued)

(58) Field of Classification Search
CPC . H04L 5/0032; H04W 72/0426; H04W 76/11; H04W 72/0433; H04W 84/12; H04W 76/15; H04W 84/045
See application file for complete search history.

(56) References Cited

U.S. PATENT DOCUMENTS

2015/0139096 A1* 5/2015 Morioka .............. H04W 28/08
370/329
2016/0183148 A1* 6/2016 Worrall ................ H04W 36/22
370/235
(Continued)

FOREIGN PATENT DOCUMENTS

EP 2836028 A1 2/2015

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access (Release 13)", 3GPP TS 23.401, V13.2.0, Mar. 2015, pp. 1-313.
(Continued)

*Primary Examiner* — Clemence S Han
(74) *Attorney, Agent, or Firm* — Nokia Technologies Oy

(57) ABSTRACT

In some example embodiments, there is provided a method. The method may include generating, by a network node, a message including an indication of whether a bearer is at least one of a default bearer or a dedicated bearer; and sending, by the network node, the generated message, wherein the generated message is sent to a base station to enable the base station to control assignment of the bearer to a macrocell when the indication represents that the bearer is a default bearer. Related systems, methods, and articles of manufacture are also described.

17 Claims, 6 Drawing Sheets

(51) Int. Cl.
  H04W 72/04    (2009.01)
  H04W 76/11    (2018.01)
  H04W 76/15    (2018.01)
  H04W 84/04    (2009.01)
  H04W 84/12    (2009.01)

(52) U.S. Cl.
  CPC ............ *H04W 76/11* (2018.02); *H04W 76/15* (2018.02); *H04W 84/045* (2013.01); *H04W 84/12* (2013.01)

(56) References Cited

U.S. PATENT DOCUMENTS

2016/0323805 A1* 11/2016 Ryu ................ H04W 36/0055
2017/0071023 A1*  3/2017 Kunz .................. H04W 36/28
2018/0139762 A1*  5/2018 Cho ................. H04W 72/1284

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description;Stage 2 (Release 12)", 3GPP TS 36.300, V125.0, Mar. 2015, pp. 1-251.

"3rd Generation Partnership Project; Technical Specification Group Radio Access Network; Evolved Universal Terrestrial Radio Access Network (E-UTRAN); X2 application protocol (X2AP) (Release 12)", 3GPP TS 36.423, V12.5.0, Mar. 2015, pp. 1-208.

"3rd Generation Partnership Project; Technical Specification Group Radio Access Network; Evolved Universal Terrestrial Radio Access Network (E-UTRAN); S1 Application Protocol (S1AP) (Release 12)", 3GPP TS 36.413, V12.5.0, Mar. 2015, pp. 1-301.

"Discussion on E-RAB(s) Failed to Modify in E-RAB Modification Confirm", 3GPP TSG-RAN Working Group 3 meeting #87, R3-150531, Agenda: 5.2, Huawei, Apr. 20-24, 2015, 3 pages.

"3rd Generation Partnership Project; Technical Specification Group Radio Access Network; Evolved Universal Terrestrial Radio Access (E-UTRA); LTE physical layer; General description(Release 12)", 3GPP TS 36.201, V12.2.0, Mar. 2015, pp. 1-14.

"3rd Generation Partnership Project; Technical Specification Group Radio Access Network; Evolved Universal Terrestrial Radio Access (E-UTRA); Physical channels and modulation(Release 12)", 3GPP TS 36.211, V12.5.0, Mar. 2015, pp. 1-136.

"3rd Generation Partnership Project; Technical Specification Group Radio Access Network; Evolved Universal Terrestrial Radio Access (E-UTRA); Multiplexing and channel coding(Release 12)", 3GPP TS 36.212, V12.4.0, Mar. 2015, pp. 1-94.

"3rd Generation Partnership Project; Technical Specification Group Radio Access Network; Evolved Universal Terrestrial Radio Access (E-UTRA); Physical layer procedures(Release 12)", 3GPP TS 36.213, V12.5.0, Mar. 2015, pp. 1-239.

"3rd Generation Partnership Project; Technical Specification Group Radio Access Network; Evolved Universal Terrestrial Radio Access (E-UTRA); Physical layer; Measurements (Release 12)", 3GPP TS 36.214, V12.2.0, Mar. 2015, pp. 1-17.

"3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331, V12.5.0, Mar. 2015, pp. 1-445.

International Search Report and Written Opinion received for corresponding Patent Cooperation Treaty Application No. PCT/US2015/030879, dated Feb. 24, 2016, 12 pages.

"3rd Generation Partnership Project; Technical Specification Group Radio Access Network; Evolved Universal Terrestrial Radio Access Network (E-UTRAN); S1 Application Protocol (S1AP) (Release 11)", 3GPP TS 36.413, V11.4.0, Jun. 2013, pp. 1-274.

"Specific issues on E-RAB management and Bearer Type", 3GPP TSG-RAN Working Group 3 meeting #83, R3-140280, Agenda: 20.2, LG Electronics Inc, Feb. 10-14, 2014, 4 pages.

* cited by examiner

200

GENERATE A MESSAGE INCLUDING AN INDICATION OF WHETHER A BEARER IS A DEFAULT BEARER (WHICH CAN BE ASSIGNED TO A MACROCELL) OR A DEDICATED BEARER 210

SEND GENERATED MESSAGE TO BASE STATION TO ENABLE THE BASE STATION TO ASSIGN A DEFAULT BEARER TO A MACROCELL 220

RECEIVE A RESPONSE MESSAGE 225

FIG. 2A

BEARER SETUP IN DUAL CONNECTIVITY

RELATED APPLICATION

This application was originally filed as PCT Application No. PCT/US2015/030879 filed May 14, 2015.

FIELD

The subject matter described herein relates to wireless

BACKGROUND

The use of heterogeneous networks (HetNets) may provide opportunities for offloading traffic from macrocells to typically higher capacity small cells. The heterogeneous network may include one or more wireless access points, such as WiFi wireless access points or small cell base stations, serving one or more small cells, and may also include one or more base stations serving macrocells. For example, a WiFi wireless access point may be implemented to cover a small cell, or coverage area, examples of which include a residence, a small business, a building, an office, or a small area. The WiFi wireless access point may have less range and output power given its limited coverage area but provide greater capacity and data rates. Accordingly, wireless service providers view small cells as a way to extend service coverage, as a way to offload traffic to the small cells, and/or as a way to provide enhanced service, such as for example higher data rates, lower latencies, energy efficiency and the like.

SUMMARY

In some example embodiments, there is provided a method. The method may include generating, by a network node, a message including an indication of whether a bearer is at least one of a default bearer or a dedicated bearer; and sending, by the network node, the generated message, wherein the generated message is sent to a base station to enable the base station to control assignment of the bearer to a macrocell when the indication represents that the bearer is a default bearer.

In some variations, one or more of the features disclosed herein including the following features can optionally be included in any feasible combination. The indication may include a first list grouping default resources. The indication may include a second list grouping dedicated resources. The indication may include a type indicator representative of whether the bearer is at least one of the default bearer or the dedicated bearer. The message may include a single list of bearers, each of which includes a corresponding type indicator representative of whether the bearer is at least one of the default bearer or the dedicated bearer. The message may include at least one of a setup request message or a radio access bearer request message. The network may include a mobility management entity. The macrocell may be served by at least one of a base station, an evolved node B base station, or a master evolved node B base station. The indication may represent that the bearer is the dedicated bearer. The generated message may enable the base station to control assignment of the dedicated bearer to a macrocell, a small cell, or a combination of both.

The above-noted aspects and features may be implemented in systems, apparatuses, methods, and/or computer-readable media depending on the desired configuration. The details of one or more variations of the subject matter described herein are set forth in the accompanying drawings and the description below. Features and advantages of the subject matter described herein will be apparent from the description and drawings, and from the claims. In some exemplary embodiments, one of more variations may be made as well as described in the detailed description below and/or as described in the following features.

DESCRIPTION OF DRAWINGS

In the drawings,

FIGS. 2A-2B depict examples of processes for dual connectivity, in accordance with some example embodiments;

Figure 1A:
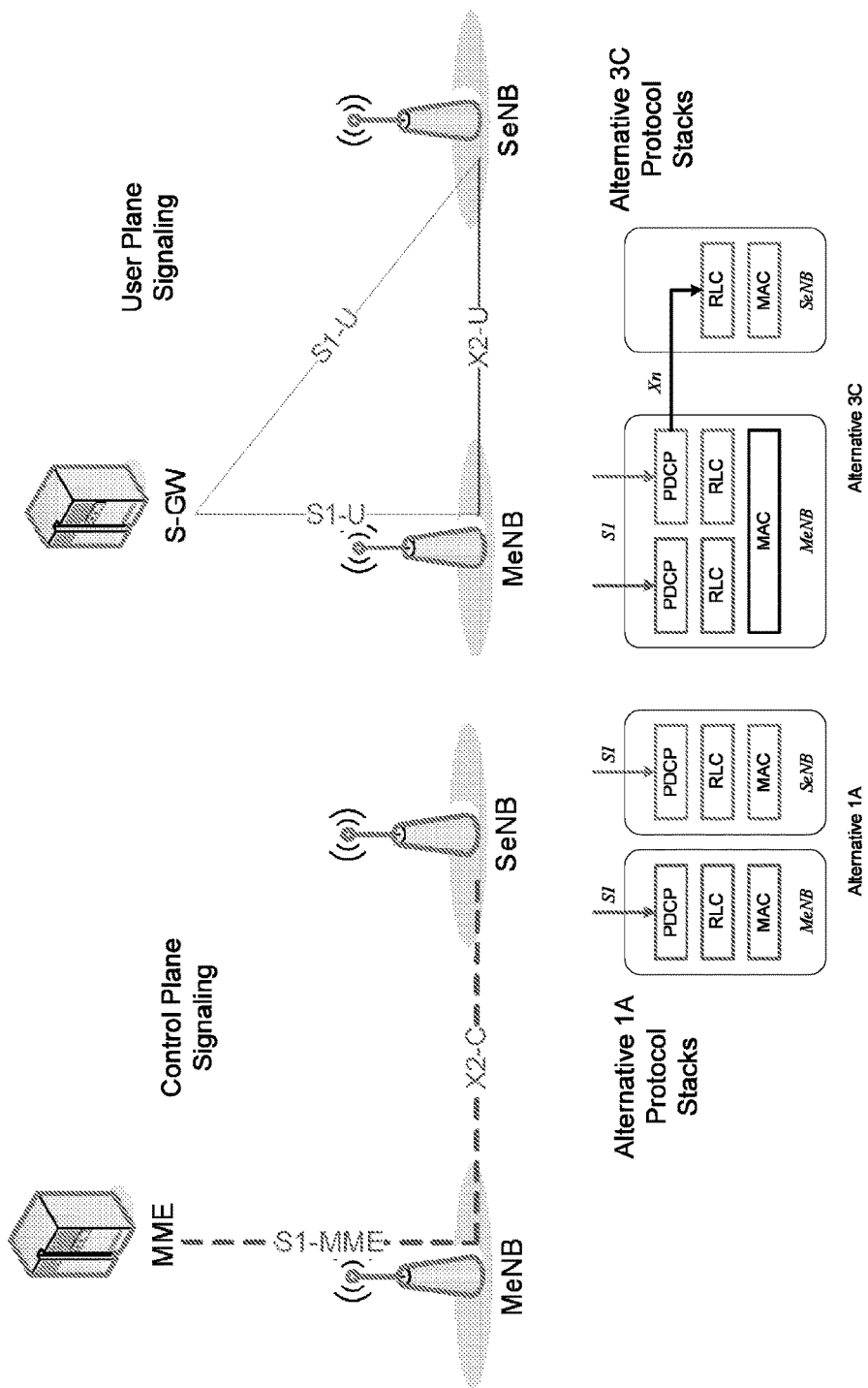
FIG. 1A depicts examples of protocol stacks used in dual connectivity, in accordance with some example embodiments.

Like labels are used to refer to the same or similar items in the drawings.

DETAILED DESCRIPTION

Dual connectivity refers to a user equipment (for example, a cell phone, a smartphone, a tablet, or other wireless device) that couples to for example a macrocell served by a primary base station, such as the master evolved node B (MeNB) base station and/or the like, and that further couples to one or more secondary, small cells served by a secondary base station or access point, such as a secondary eNB base station (SeNB). Carrier aggregation is an example of dual connectivity. In carrier aggregation for example, a user equipment may access a primary carrier of the macrocell and access one or more secondary carriers of the small cell(s). Dual connectivity may thus be used in cellular networks to increase the capacity of the cellular network on a per user equipment basis by enabling access to small cells, which may comprise picocells, macrocell, femtocells, and/or wireless local area networks. Moreover, dual connectivity including resource allocation may be under the control of the cellular network. Some aspects of dual connectivity have been described in standards, such as TS 36.300, TS 36.423, TS36.413, and/or the like.

The Evolved Packet System (EPS) may provide radio interfaces and a packet core network for broadband wireless data access. The EPS core network may provide at least a mobility management entity (MME), a packet data network gateway (PDN-GW), a serving gateway (S-GW), and/or other nodes as well.

In dual connectivity, the primary base station, such as the master evolved node B (MeNB) base station, may signal, via radio resource control (RRC) signaling, the user equipment. Moreover, this signaling may control dual connectivity establishment (for example, set-up) as well as dis-establishment (for example, tear-down). To that end, the MeNB may also control, or signal, which radio bearer(s) and bearer type option(s) may be served by the secondary base station(s), such as the SeNB(s). The bearer, such as an e-RAB (EUTRAN radio access bearers) and/or the like, may take the form of a default radio access bearer or a dedicated radio access bearer. The dedicated bearers may comprise bearers that are in addition, or on top of, the default bearer established during the user equipment's connection set-up with the MeNB. The dedicated bearer may thus be linked to a previously established default bearer. However, current standards may allow the MeNB base station to decide to use a small cell bearer as the default bearer, and the MeNB may also decide to use the master cell bearer as a dedicated bearer.

FIG. 1A depicts the control plane signaling interface (S1) from a mobility management entity (MME) to an eNB base station, such as a MeNB. FIG. 1A also depicts the user plane interface (Uu) between a serving gateway (S-GW) and the eNB base station, such as the MeNB.

FIG. 1A also depicts examples of MeNB and SeNB protocol stacks for dual connectivity including the packet data convergence protocol (PDCP, radio link control (RLC), and media access control (MAC) layers. In the case of the 1A alternative protocol stack, the MeNB may decide whether a bearer should be set up via a macrocell, such as a master cell group, or via a small cell, such as a small cell group, at the time of bearer establishment. The decision may depend on radio conditions and may also depend on the type of backhaul available at the access point or base station, although other factors may be taken into account as well. For the 3C alternative architecture (or split bearer option), the MeNB may decide whether a downlink packet should be transmitted via the macrocell or the small cell, while the uplink transmission is ongoing (which is somewhat more of a dynamic selection of route when compared to 1A alternative).

In both 1A and 3C for example, assigning a default bearer to a small cell group of resources may not be optimal because the small cell may have a smaller range than a macrocell served by the macro eNB (which may be implemented as an MeNB). As the user equipment moves, the user equipment (UE) is more likely to leave the coverage area of the small cell but still be covered by the macrocell. When the user equipment leaves the small cell coverage, the user equipment may also lose the assigned default bearer, which may cause the entire packet data network (PDN) connection to be dropped (which is worrisome if the PDN connection was assigned to a high reliability communication). In contrast, losing only the dedicated bearer may not be so catastrophic, as the underlying default bearer still remains.

In some example embodiments, a default bearer may be mapped to a master cell group of resources for a master cell (for example, macrocell, MeNB, and/or the like). But dedicated bearers can be mapped to macrocells, small cells, or split between small cells and microcells.

In some example embodiments, a network node, such as a mobility management entity (MME), may provide a list of bearers to a base station or access point. And, this list of bearers may distinguish between default bearers and dedicated bearers. In this way, the base station may assign the default bearer and/or a dedicated bearer in a controlled, predictable way, rather than in a somewhat random way as noted above with respect to the 1A and 3C alternatives.

Although some of the examples refer herein to an MME, other network nodes may be used as well.

In some example embodiments, a network node, such as an MME, may send a message to a base station or access point. This message may indicate that certain bearers may be used as default bearers. Alternatively or additionally, the message may indicate that other bearers may be used as dedicated bearers.

In some example embodiments, a node, such as the MME, may send a message including a list of bearers requested. The message may be carried by, or configured in accordance with, a setup request message, such as an initial context setup request message, an E-UTRAN radio access bearer set up request (E-RAB SETUP REQUEST) message, and/or the like, such that the default bearers and the dedicated bearers can be differentiated. In the case of an E-RAB, it may identify the concatenation of an S1 Bearer and the corresponding data radio bearer. When an E-RAB exists, there may be a one-to-one mapping between the E-RAB and an EPS bearer of the non-access stratum.

In some example embodiments, the node, such as the MME, may send the message including two independent lists, in accordance with some example embodiments. For example, the MME may send a message including a first list having the default bearer(s) grouped to enable use and a second list having dedicated bearer(s) grouped to enable use.

In some example embodiments, the node, such as the MME, may send the message including a single list in which each bearer may have an additional indicator of bearer type, in accordance with some example embodiments. For example, the MME may send a message including a list including the bearer(s) available for use (or assigned), and each listed bearer may include an additional indicator to identify whether the bearer is a default bearer or a dedicated bearer. The MeNB may receive the message sent by the MME and use the indication of default bearer or dedicated bearer to ensure the proper mapping of the default bearer to the master cell, rather than the small cell. For example, the MeNB may map the master control group resources to a default bearer, when for example the dual connectivity type 1A architecture is in use. With respect to the dedicated bearers, the MeNB may determine whether to map the dedicated bearers to the master control group, secondary control group, or split the dedicated bearer among both groups.

Before providing additional details regarding the bearer allocation control disclosed herein, the following provides a description of an example system, in accordance with some example embodiments.

Figure 1B:
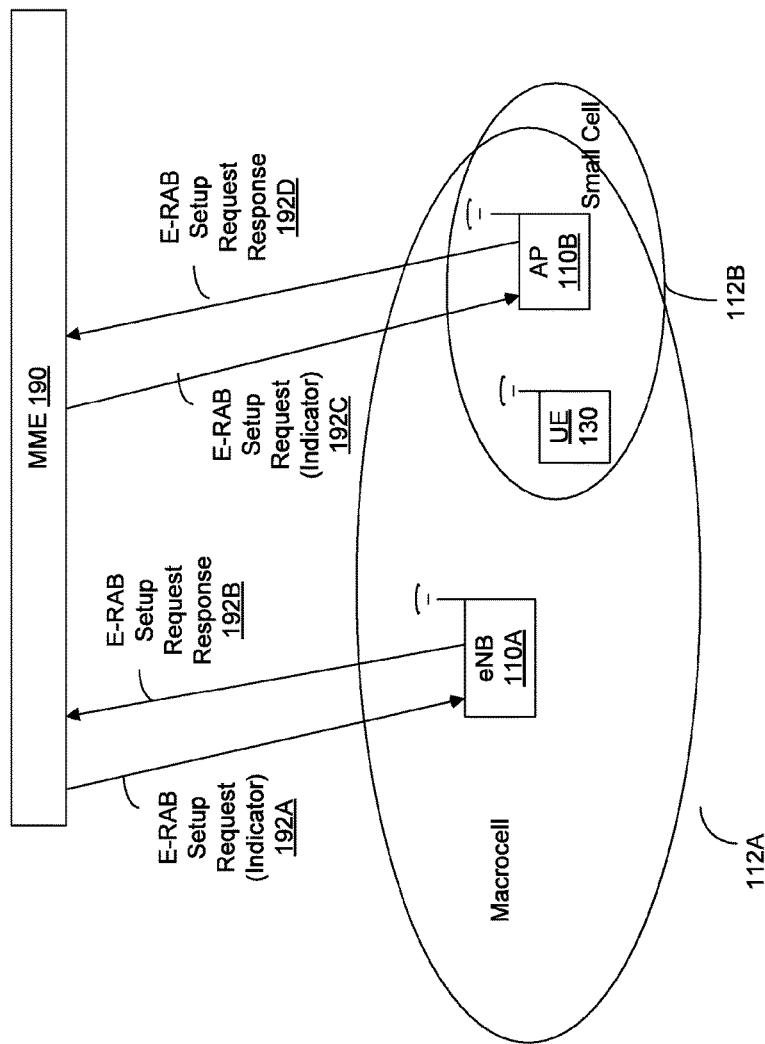
FIG. 1B depicts an example of a system for dual connectivity, in accordance with some example embodiments.

FIG. 1B depicts an example system 100, in accordance with some example embodiments. System 100 may include a network node, such MME 190 and a small cell base station 110B (labeled AP, examples of which include an SeNB, a WiFi access point and/or the like) serving a small cell coverage area 112B. System 100 may also include a cellular base station 110A (labeled eNB, examples of which an evolved Node B base station (eNB), MeNB, and/or the like) serving a macro cell 112A, in accordance with some example embodiments.

System 100 may also include a user equipment 130, such as a smartphone, cell phone, tablet, and/or other type of wireless device. Moreover, the user equipment 130 may be configured to operate in a dual connectivity mode.

Although FIG. 1B depicts a specific quantity and configuration of base stations, cells, nodes, user equipment, and the like, other quantities and configurations may be implemented as well. Moreover, the base station and access point may include backhaul links to other networks (for example, the internet), nodes (other base stations, wireless access points, gateways, the MME, and so forth), and/or the like. Furthermore, although some of the examples described herein refer to WiFi, other small cell radio technologies may be used as well.

In some example embodiments, MME 190 may send a message 192A to a base station 110A, such as an eNB, an MeNB, and/or the like. The message 192A may include a radio access bearer setup message, such as a EUTRAN radio access bearer setup request (E-RAB setup request) message.

The message 192A may request resource assignment for the user plane (Uu) and/or the control plane (S1 for example, which is the control interface between the MME and base station or access point) for one or more radio access bearers. In response to receiving message 192A, base station 110A may respond with a message 192B, such as a EUTRAN radio access bearer setup response message. The MME 190 may send a bearer request message 192C to other base station or access points as well including small cell base station 110B, which may respond with message 192D.

Referring again to message 192A, it may indicate, in accordance with some example embodiments, whether a radio access bearer can be used as a default bearer and/or whether it can be used as a dedicated bearer. For example, one or more radio access bearers may be listed in a default bearer group of resources, while one or more other bearers may be listed in a dedicated bearer group of resources.

In some example embodiments, the message 192A may include a first list including one or more default bearers and a second list of one or more dedicated bearers. An example of an implementation of the first list and the second list is shown below at Table 1. Specifically, Table 1 below depicts example information elements which may be included in message 192A, such as an E-RAB setup request message. The message 192A may include a message type (line 1) to indicate that the message is a radio access bearer setup request message. The message 192A may also include an MME UE S1AP ID for identifying the user equipment (UE) over the S1 (line 2), a eNB UE S1AP ID for identifying UE over the S1 (line 3), a UE aggregate maximum bit rate for signaling to the user equipment 130 the maximum total allocated bit rate (line 4), a first list of default radio access bearers (lines 5-13), and/or a second, separate list of dedicated radio access bearers (lines 14-22). In some example embodiments, the first list of default radio access bearers (lines 5-13) may include one or more default radio access bearers. For each of the radio access bearers, the message 192A may include identifiers for the default radio access bearer(s), quality of service parameters for the default radio access bearer(s), transport layer address for the default radio access bearer(s), GPRS tunneling protocol-tunnel endpoint identifier (GTP-TEID) for the default radio access bearer(s), non-access stratum packet data unit (NAS-PDU) for the default radio access bearer(s), a correlation ID for the default radio access bearer(s), and/or selective IP traffic offload (SIPTO) correlation ID for the default radio access bearer(s).

In the example depicted at Table 1, an additional default radio access bearer would be included as an additional block with corresponding identifiers, quality of service parameters, and the like.

In some example embodiments, the second list of dedicated radio access bearers (lines 14-22) may include one or more dedicated radio access bearers, identifiers for the dedicated radio access bearer(s), quality of service parameters for the dedicated radio access bearer(s), a transport layer address for the dedicated radio access bearer(s), GTP-TEID for the dedicated radio access bearer(s), NAS-PDU for the dedicated radio access bearer(s), a correlation ID for the dedicated radio access bearer(s), and/or SIPTO correlation ID for the dedicated radio access bearer(s).

TABLE 1

| IE/Group Name | Range | Semantics description |
|---|---|---|
| 1  Message Type | | |
| 2  MME UE S1AP ID | | |
| 3  eNB UE S1AP ID | | |
| 4  UE Aggregate Maximum Bit Rate | | |

TABLE 1-continued

| IE/Group Name | Range | Semantics description |
|---|---|---|
| 5  Default E-RAB to be Setup | 1 | |
| 6  >E-RAB To Be Setup Item IEs | 1 . . . <maxnoof E-RABs> | |
| 7  >>E-RAB ID | | |
| 8  >>E-RAB Level QoS Parameters | | Includes necessary QoS parameters. |
| 9  >>Transport Layer Address | | |
| 10  >>GTP-TEID | | EPC TEID. |
| 11  >>NAS-PDU | | |
| 12  >>Correlation ID | | |
| 13  >>SIPTO Correlation ID | | |
| 14  Dedicated E-RAB to be Setup List | 1 | |
| 15  >E-RAB To Be Setup Item IEs | 1 . . . <maxnoof E-RABs> | |
| 16  >>E-RAB ID | | |
| 17  >>E-RAB Level QoS Parameters | | Includes necessary QoS parameters. |
| 18  >>Transport Layer Address | | |
| 19  >>GTP-TEID | | EPC TEID. |
| 20  >>NAS-PDU | | |
| 21  >>Correlation ID | | |
| 22  >>SIPTO Correlation ID | | |

In some example embodiments, the message 192A may include a single list of one or more bearers, and each bearer may include an indicator of whether the bearer is a default bearer or a dedicated bearer. Table 2 below depicts an example of this single list implementation, in accordance with some example embodiments. In the example of Table 2, the default and dedicated bearers are provided as a single list but each bearer may include a type indicator (see, for example, line 14 "bearer type") to signal whether the bearer is a default bearer or a dedicated bearer. In the example depicted at Table 2, a single block (lines 5-14) corresponding to a single radio access bearer is shown, so additional radio access bearers would be subsequently listed as additional blocks with corresponding identifiers, quality of service parameters, and the like.

TABLE 2

| IE/Group Name | Range | Semantics description |
|---|---|---|
| 1  Message Type | | |
| 2  MME UE S1AP ID | | |
| 3  eNB UE S1AP ID | | |
| 4  UE Aggregate Maximum Bit Rate | | |
| 5  E-RAB to be Setup List | 1 | |
| 6  >E-RAB To Be Setup Item IEs | 1 . . . <maxnoof E-RABs> | |
| 7  >>E-RAB ID | | |
| 8  >>E-RAB Level QoS Parameters | | Includes necessary QoS parameters. |
| 9  >>Transport Layer Address | | |
| 10  >>GTP-TEID | | EPC TEID. |
| 11  >>NAS-PDU | | |
| 12  >>Correlation ID | | |
| 13  >>SIPTO Correlation ID | | |
| 14  >> bearer type | | Default or dedicated |

FIG. 2A depicts an example process 200 for dual connectivity at a network node, in accordance with some example embodiments.

At 210, a network node may generate a message including an indication of whether a bearer is a default bearer (which can be assigned to a macrocell) or a dedicated bearer (which can be assigned to a macrocell or a small cell), in accordance with some example embodiments. For example, a network node, such as MME 190, may generate message 192A. The message 192A may include an indication of whether a bearer is a default bearer or a dedicated bearer. For example, the indication may take the form of separate listings of bearers, so the dedicated bearers are grouped in a first list and the default bearers are grouped in another, separate list as described above with respect to Table 1. Alternatively or additionally, the indication may take the form of an indicator bit (or field) that explicitly defines the type of each bearer. For example, the message 192A may include a single list of bearers in which each bearer includes a bearer type indicative of whether the bearer is a default or dedicated bearer as shown above at line 14 of Table 2. As noted above, the message 192A may be sent as an e-RAB setup request message, although other types of messages may be used as well.

At 220, the MME 190 may send the generated message 192A to a base station, such as base station 110A, in accordance with some example embodiments. The message 192A may enable the base station 110A to assign default bearers only to macrocells, rather than small cells. On the other hand, dedicated bearers may be assigned to macrocell or small cells.

At 225, the MME190 may receive a response message 192B, in accordance with some example embodiments. The response message 192B may comprise an e-RAB setup request response message, in accordance with some example embodiments.

Process 200 enable a base station to assign the default bearer to a macrocell, rather than a small cell. In this way, the UE may receive a default bearer mapped to a macrocell.

Figure 2B:
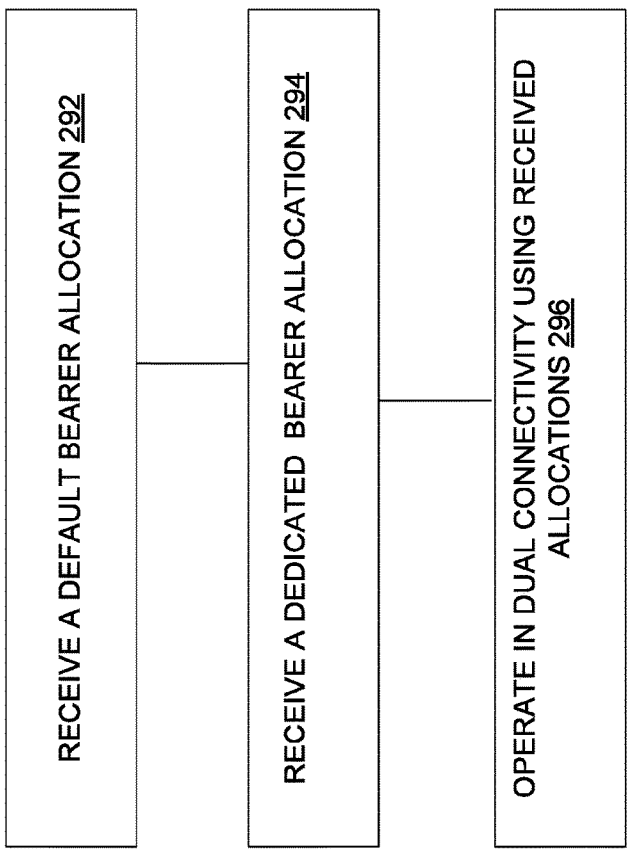

FIG. 2B depicts an example process 299 for dual connectivity at a user equipment, in accordance with some example embodiments.

At 292, a user equipment, in dual connectivity, may receive a default bearer allocation mapped to a macrocell, in accordance with some example embodiments. At 294, the user equipment, in dual connectivity, may receive a dedicated bearer allocation mapped to a macrocell or a small cell, in accordance with some example embodiments. The default and dedicated bearers may have been allocated by the MME to the base station as described above with respect to process 200 (see also for example, Tables 1 and 2 above). At 296, the user equipment may operate in dual connectivity using the allocated bearer allocation received at 292 and 294, in accordance with some example embodiments. The user equipment may receive the default bearer (allocated per process 200 above) followed by dedicated bearer information. The user equipment may request a dedicated bearer after default bearer allocation. The user equipment may use the default bearer for operations and/or control of the dual connectivity.

Figure 3:
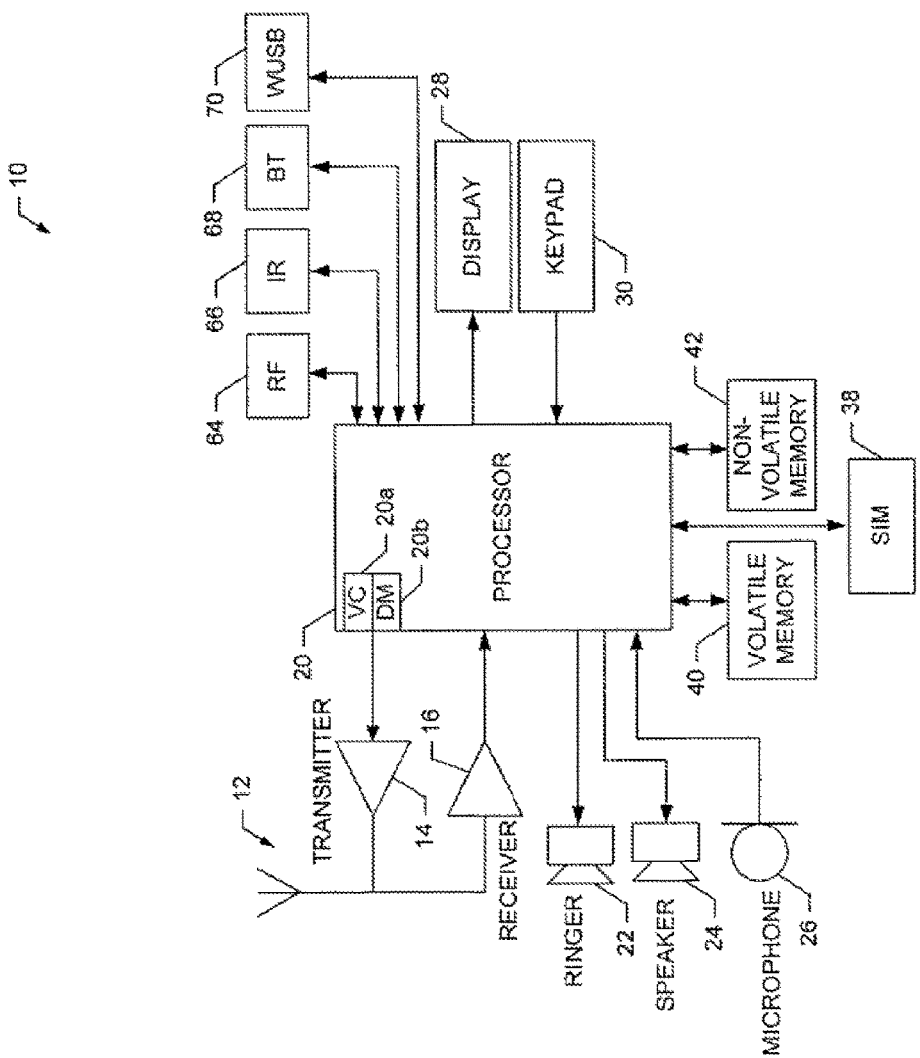
FIG. 3 depicts an example of an apparatus, in accordance with some example embodiments.

FIG. 3 depicts an example of an apparatus 10, in accordance with some example embodiments. The apparatus 10 may comprise user equipment 130, such as a smart phone, a tablet, a cell phone, a wearable radio device, a tag, an Internet of Things device, and/or any other radio based device.

In some example embodiments, apparatus 10 may be configured to operate in a dual connectivity mode. Dual connectivity may be used as part of carrier aggregation as well.

Apparatus 10 also include a radio communication link to a cellular network, or other wireless network. The apparatus 10 may include an antenna array 12 in communication with a transmitter 14 and a receiver 16. Alternatively transmit and receive antennas may be separate.

The apparatus 10 may also include a processor 20 configured to provide signals to and from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Apparatus 10 may include a location processor and/or an interface to obtain location information, such as positioning and/or navigation information. Accordingly, although illustrated in as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as, Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as, Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 130 may be additionally capable of operating in accordance with 3.9G wireless communication protocols, such as, Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as, a web browser. The connectivity program may allow the apparatus 10 to transmit and receive web content, such as location-based content, according to a protocol, such as, wireless application protocol, wireless access point, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 10 to receive data, such as, a keypad 30 (which can be a virtual keyboard presented on display 28 or an externally coupled keyboard) and/or other input devices.

Moreover, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth (BT) transceiver 68 operating using Bluetooth wireless technology, a wireless universal serial bus (USB) transceiver 70, and/or the like. The Bluetooth transceiver 68 may be capable of operating according to low power or ultra-low power Bluetooth technology, for example, Wibree, Bluetooth Low-Energy, NFC, and other radio standards. In this regard, the apparatus 10 and, in particular, the short-range transceiver may be capable of transmitting data to and/or receiving data from electronic devices within proximity of the apparatus, such as within 10 meters. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as, a subscriber identity module (SIM) 38, a removable user identity module (R-UIM), and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations as described herein at for example process 299 and/or the like. The memories may comprise an identifier, such as an international mobile equipment identification (IMEI) code, capable of uniquely identifying apparatus 10. In the example embodiment, the processor 20 may be configured using computer code stored at memory 40 and/or 42 to provide the operations, such as receive, at the apparatus 10 which is in a dual connectivity configuration, a default bearer allocation mapped to a macrocell; receive, at the apparatus 10 which is in a dual connectivity configuration, a dedicated bearer allocation mapped to a macrocell or a small cell; and operate, at the apparatus 10 which is in a dual connectivity configuration, using the allocated bearer allocation.

Some of the embodiments disclosed herein may be implemented in software, hardware, application logic, or a combination of software, hardware, and application logic. The software, application logic, and/or hardware may reside in memory 40, the control apparatus 20, or electronic components disclosed herein, for example. In some example embodiments, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry. A computer-readable medium may comprise a non-transitory computer-readable storage medium that may be any media that can contain or store the instructions for use by or in connection with an instruction execution system, apparatus, or device, such as a computer. Furthermore, some of the embodiments disclosed herein include computer programs configured to cause methods as disclosed herein with respect to the network including process 299 and/or the like.

Figure 4:
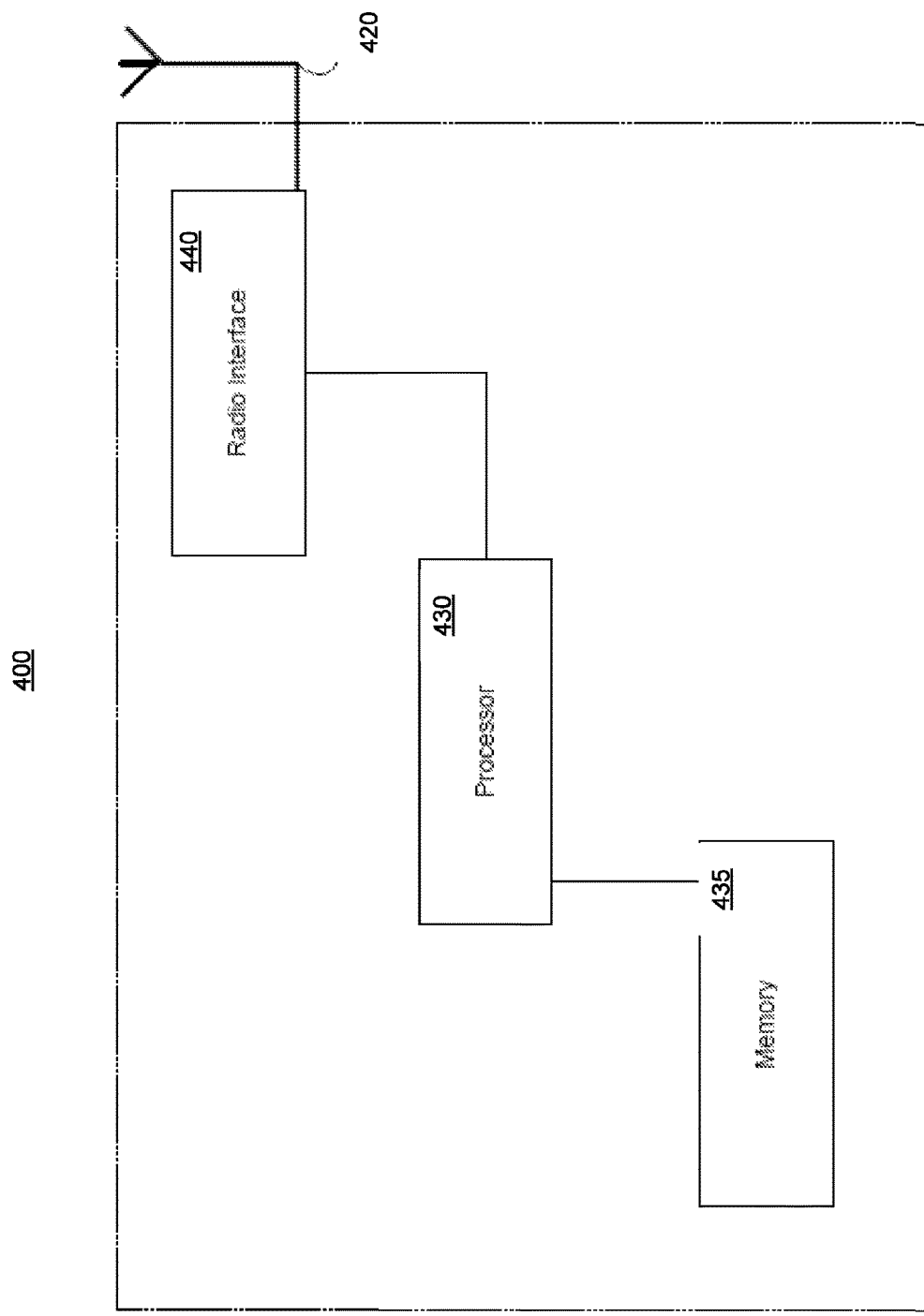
FIG. 4 depicts another example of an apparatus, in accordance with some example embodiments.

FIG. 4 depicts an example implementation of a network node 400, such as a wireless access point 110B or a base station 110A, in accordance with some example embodiments. The node 400 may include one or more antennas 420 configured to transmit via downlinks and configured to receive uplinks via the antenna(s) 420. The node 400 may further include a plurality of radio interfaces 440 coupled to the antenna(s) 420. The radio interfaces 440 may correspond to a plurality of radio access technologies including one or more of cellular, LTE, WLAN, Bluetooth, BT-LE, NFC, radio frequency identifier (RFID), ultrawideband (UWB), ZigBee, and the like. The radio interface 440 may include circuitry, such as filters, converters (for example, digital-to-analog converters and the like), mappers, a Fast Fourier Transform (FFT) module, and the like. The node 400 may further include one or more processors, such as processor circuitry 430, for controlling the node 400 and for accessing and executing program code stored in memory 435. In some example embodiments, the memory 435 includes program code, which when executed by at least one processor, causes one or more of the operations described herein with respect to the base station 110A and/or wireless access point 110B. For example, the operations may include generation of a message including an indication of whether a bearer is a default bearer (which can be assigned to a macrocell) or a dedicated bearer (which can be assigned to a macrocell or a small cell), initiation (or sending) of the message to a base station, and/or receiving a response to the sent message. In some example embodiments, the network node of FIG. 4 may be implemented as MME 190. When this is the case, the apparatus 400 may include a network interface, rather than a radio interface, in order to send and/or receive message to other network nodes, such as base station 110A and/or the like.

The base station 110A and/or 110B may, in some example embodiments, be implemented as an evolved Node B (eNB) type base station, although other types of radio, access points may be implemented as well such as WLAN or Wi-Fi type of access point. When the evolved Node B (eNB) type base station is used, the base may be configured in accordance with standards, including the Long Term Evolution (LTE) standards, such as for example 3GPP TS 36.201, Evolved Universal Terrestrial Radio Access (E-UTRA), Long Term Evolution (LTE) physical layer, General description, 3GPP TS 36.211, Evolved Universal Terrestrial Radio Access (E-UTRA), Physical channels and modulation, 3GPP TS 36.212, Evolved Universal Terrestrial Radio Access (E-UTRA), Multiplexing and channel coding, 3GPP TS 36.213, Evolved Universal Terrestrial Radio Access (E-UTRA), Physical layer procedures, 3GPP TS 36.214, Evolved Universal Terrestrial Radio Access (E-UTRA), Physical layer—Measurements Protocol specification, 3GPP TS 36.331, Technical Specification Group Radio Access Network, Evolved Universal Terrestrial Radio Access (E-UTRA), Radio Resource Control (RRC), and any subsequent additions or revisions to these and other 3GPP series of standards (collectively referred to as LTE standards). The wireless access point 110A and/or 110B may also be configured to serve cells using a WLAN technology, such as for example WiFi (for example, the IEEE 802.11 series of standards), as well as any other radio access technology capable of serving a cell.

Without in any way limiting the scope, interpretation, or application of the claims appearing below, a technical effect of one or more of the example embodiments disclosed herein is enhanced dual connectivity operation and/or ensuring the best anchor is used for the default bearer to enable maintaining the service for an end user.

The subject matter described herein may be embodied in systems, apparatus, methods, and/or articles depending on the desired configuration. For example, the systems, apparatus, methods, and/or articles described herein can be implemented using one or more of the following: electronic components such as transistors, inductors, capacitors, resistors, and the like, a processor executing program code, an application-specific integrated circuit (ASIC), a digital signal processor (DSP), an embedded processor, a field programmable gate array (FPGA), and/or combinations thereof. These various example embodiments may include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "machine-readable medium" refers to any computer program product, computer-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the example embodiments described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. Other embodiments may be within the scope of the following claims.

What is claimed:

1. A method, comprising:

generating, by a network node, a message including an indication of whether a bearer is at least one of a default bearer or a dedicated bearer; and sending, by the network node, the generated message to a base station, wherein the generated message enables the base station to control assignment of the bearer to a macrocell when the indication represents that the bearer is a default bearer, wherein when the indication represents that the bearer is the dedicated bearer, the generated message enables the base station to control the assignment of the dedicated bearer to a macrocell, a small cell, or a combination of both.

2. The method of claim 1, wherein the indication comprises a first list grouping default resources.

3. The method of claim 1, wherein the indication comprises a second list grouping dedicated resources.

4. The method of claim 1, wherein the indication comprises a type indicator representative of whether the bearer is at least one of the default bearer or the dedicated bearer.

5. The method of claim 1, wherein the message includes a single list of bearers, each of which includes a corresponding type indicator representative of whether the bearer is at least one of the default bearer or the dedicated bearer.

6. The method of claim 1, wherein the message comprises at least one of a setup request message or a radio access bearer request message.

7. The method of claim 1, wherein the network node comprises a mobility management entity.

8. The method of claim 1, wherein the macrocell is served by at least one of a base station, an evolved node B base station, or a master evolved node B base station.

9. An apparatus, comprising:
at least one processor; and
at least one memory including computer program code, the at least one memory and the computer program code configured to, with the at least one processor, cause the apparatus to at least perform:
generate a message including an indication of whether a bearer is at least one of a default bearer or a dedicated bearer; and
send the generated message to a base station, wherein the generated message enables the base station to control assignment of the bearer to a macrocell when the indication represents that the bearer is a default bearer, wherein when the indication represents that the bearer is the dedicated bearer, the generated message enables the base station to control the assignment of the dedicated bearer to a macrocell, a small cell, or a combination of both.

10. The apparatus of claim 9, wherein the indication comprises a first list grouping default resources.

11. The apparatus of claim 9, wherein the indication comprises a second list grouping dedicated resources.

12. The apparatus of claim 9, wherein the indication comprises a type indicator representative of whether the bearer is at least one of the default bearer or the dedicated bearer.

13. The apparatus of claim 9, wherein the message includes a single list of bearers, each of which includes a corresponding type indicator representative of whether the bearer is at least one of the default bearer or the dedicated bearer.

14. The apparatus of claim 9, wherein the message comprises at least one of a setup request message or a radio access bearer request message.

15. The apparatus of claim 9, wherein the apparatus comprises or is comprised in a mobility management entity.

16. The apparatus of claim 9, wherein the macrocell is served by at least one of a base station, an evolved node B base station, or a master evolved node B base station.

17. A non-transitory computer-readable storage medium including program code which when executed by at least one processor causes operations comprising:
generating, by a network node, a message including an indication of whether a bearer is at least one of a default bearer or a dedicated bearer; and
sending, by the network node to a base station, the generated message, wherein the generated message enables the base station to control assignment of the bearer to a macrocell when the indication represents that the bearer is a default bearer, wherein when the indication represents that the bearer is the dedicated bearer, the generated message enables the base station to control the assignment of the dedicated bearer to a macrocell, a small cell, or a combination of both.

* * * * *